United States Patent
Allaire et al.

(10) Patent No.: US 6,896,928 B2
(45) Date of Patent: May 24, 2005

(54) TWO-LAYER PROTECTIVE COATING SYSTEM FOR LCD GLASS

(75) Inventors: Roger A. Allaire, Big Flats, NY (US); Adra S. Baca, Corning, NY (US); Ching-Kee Chien, Horseheads, NY (US); Adrienne M. Powell-Johnson, Horseheads, NY (US); David N. Schissel, Painted Post, NY (US); Edward J. Sever, Corning, NY (US); Youchun Shi, Horseheads, NY (US)

(73) Assignee: Corning Incorporated, Corning, NY (US)

(*) Notice: Subject to any disclaimer, the term of this patent is extended or adjusted under 35 U.S.C. 154(b) by 150 days.

(21) Appl. No.: 10/165,488

(22) Filed: Jun. 7, 2002

(65) Prior Publication Data

US 2003/0228470 A1 Dec. 11, 2003

(51) Int. Cl.$^7$ ................................. B05D 1/36
(52) U.S. Cl. ............ 427/154; 427/165; 427/168; 427/169; 427/282; 427/289; 427/293; 427/407.2; 427/416; 427/417
(58) Field of Search ............... 427/154, 282, 427/417, 415, 402, 289, 293, 168, 169, 165, 407.2, 416

(56) References Cited

U.S. PATENT DOCUMENTS

| | | | |
|---|---|---|---|
| 4,548,967 A | 10/1985 | Brown et al. ............... 524/56 |
| 4,632,848 A * | 12/1986 | Gosset et al. ............... 427/154 |
| 5,017,237 A | 5/1991 | Svensson ..................... 134/4 |
| 5,308,647 A | 5/1994 | Lappi ......................... 427/154 |
| 5,418,006 A * | 5/1995 | Roth et al. .................. 427/154 |
| 6,117,485 A | 9/2000 | Woodhall et al. ........... 427/156 |
| 6,225,276 B1 | 5/2001 | Gassenmeier ............... 510/438 |
| 6,233,972 B1 | 5/2001 | Foster et al. ................ 427/154 |
| 6,379,746 B1 | 4/2002 | Birch et al. ................. 427/154 |
| 6,491,972 B1 * | 12/2002 | Weber et al. ............... 427/154 |
| 6,689,414 B2 * | 2/2004 | Weber et al. ............... 427/154 |
| 6,715,316 B2 * | 4/2004 | He et al. ..................... 65/23 |

FOREIGN PATENT DOCUMENTS

DE    19906333 A1    8/2000

OTHER PUBLICATIONS

"Improving Water Resistance of Starch Coatings" pp. 129–140.
"Waxes, Polymer Material Encyclopedia," (Eds. Herman F. Mark et al., John Wiley & Sons, 1989) vol. 17, pp. 614–626.
Polyelectrolytes (Chain Models of Polyions), Bekturov et al., 1996 by CRC Press, Inc. pp. 5800–5815.

\* cited by examiner

*Primary Examiner*—Kirsten Jolley
(74) *Attorney, Agent, or Firm*—Siwen Chen (57) ABSTRACT

Two-layer protective coating system for glass surfaces is disclosed. The base coating comprises at least one polysaccharide, and the top coating has a lower solubility in water than the base coating. The coating system provides good protection against contaminants and glass chips, good removability in mild cleaning condition, and extra water resistance during process steps where water is used as a cooling agent.

57 Claims, 1 Drawing Sheet

TWO-LAYER PROTECTIVE COATING SYSTEM FOR LCD GLASS

FIELD OF THE INVENTION

The present invention relates to the protection of glass surfaces, and in particular, to the temporary protection of the surfaces of glass sheets used in producing liquid crystal displays (LCDs). The invention is useful, for example, in protecting the glass sheets from being contaminated by ambient dirt or glass chips produced during the processing of the sheets, such as cutting, grinding, packing and transportation. In addition, the invention is useful in protecting the glass sheets from scratching.

BACKGROUND OF THE INVENTION

Many uses of glass, including glass for producing LCDs, require a very clean glass surface that is substantially free of dust and other organic and/or inorganic contaminants. When exposed to the environment, glass surface can quickly become contaminated with dust and other inorganic and/or organic ambient contaminants, with contamination being observed within a few hours.

Current procedures used to cut and grind glass surfaces and edges often generate small glass chips. Such chips can have a size in the range between about 1 and 100 microns. Some of these particles irreversibly adhere to the clean glass surface, rendering the glass useless for many applications. This is particularly a serious problem for LCD glass surfaces.

LCD glass can be made by fusion draw process, which yields flat and smooth glass surfaces. The glass sheets can be cut to the desired size and then the edges ground. If water is actively involved between the surface and the glass chips generated during cutting and grinding, permanent chemical bonding may occur, rendering the adhesion of the glass chips to the surface irreversible.

One known method of protecting glass surfaces, specifically, surfaces of LCD glass sheets, is to apply a preformed polymer film on both major surfaces of the glass to protect the glass during the scoring, breaking and beveling process. In a typical method, one major surface has a polymer film attached with an adhesive, and the other major surface has a film attached by static charge. The first film is removed after the edge finishing (cutting and/or grinding) of the sheet is completed, while the second is removed prior to the finishing process. Although the adhesive-backed film protects the surface from scratching by the handling equipment, it causes other problems. Another problem with this film is that it may leave an adhesive residue on the glass surface. A further problem with the film approach is glass breakage during peeling of the film from the glass surface, especially for large and/or thin glass sheets.

Many polymer coatings, such as polyvinyl alcohol, can offer particle protection and scratch resistance capabilities. However, few of them can be completely removed in a cleaning solution at a temperature as low as 40° C. in a typical manufacturing process. One method of temporarily protecting glass surface, especially LCD glass surface, involves applying an aqueous solution of polysaccharides (e.g., a starch) to the glass surface, forming a protective coating of the polysaccharides on the glass surface by removing water from the solution, and then subsequently removing the polysaccharide-containing coating from the surface using an aqueous solution when desired to reveal the protected surface. The removing aqueous solution may contain a detergent. The polysaccharide coating formed on the glass surface offers particle protection and scratch resistance capabilities. However, the high water solubility of polysaccharides, especially starches, constitutes a potential drawback of this method. Before the cleaning step, glass sheets are usually subjected to other finishing steps such as cutting and edge grinding, in which water may be used as a cooling agent. Due to their high solubility in water, the polysaccharide coatings may be diminished during such stages, leading to reduced particle protection and scratch resistance.

A desirable property of the temporary protective coating for surface of LCD glass is its removability. Manufacturers of LCDs use the glass as the starting point for complex manufacturing processes in which semiconductors, e.g., thin film transistors, are formed on the glass substrates. In order not to adversely affect such processes, any protective coatings on the glass surface must be readily removable prior to the beginning of the LCD production process, without substantially changing the chemical and physical characteristics of the glass surface.

Therefore, there remains a need for an improved method of temporarily protecting the surface of glass using a coating system, especially glass for producing LCDs, from being contaminated by ambient contaminants, contaminants produced during the processing of the glass and/or scratching. The coating system should be easy to be removed and does not leave residue on the glass surface upon removal, whereby a substantially clean and coating-free surface can be restored for further use of the glass, e.g., for the production of LCDs.

In view of the foregoing, there has been a need in the art for a method for protecting surface of glass, especially glass sheets for the production of liquid crystal displays, which has the following characteristics:

(1) The method should be preferably one that can be easily incorporated in the overall glass forming process, specifically, at the end of the forming process, so that newly formed glass is protected substantially immediately after it is produced. Thus, the coating material should be able to withstand the environment of the glass forming line (e.g., high temperatures). In addition, the method should be safe to use in such an environment;

(2) The coating must offer sufficient protection to the glass surface from being adhered to and contaminated by contaminants produced during the processing of the glass sheet, including cutting and/or grinding, and/or ambient contaminants, organic and/or inorganic, that the glass surface typically may come into contact with during packing, storage and shipment prior to use;

(3) The coating must be sufficiently robust to continue to provide protection after being exposed to the substantial amount of water which typically comes into contact with the glass surface during the processing of the glass, including cutting and/or grinding. This requires that the coating system has a sufficiently low solubility in water under the processing condition;

(4) The coating should preferably protect the glass sheet from scratching during processing, handling, shipping, and storage (as used herein, scratching includes abrasion). More preferably, the coating should permit the glass sheets to be stacked very closely with minimal spacing materials between them during handling, shipping and storage;

(5) The coating should be substantially completely removable from the glass prior to its ultimate use in, for example, producing a liquid crystal display. Preferably, the removing condition should be mild and environmentally friendly; and (6) The coating should preserve the pristine glass surface without substantially changing the surface's chemical composition and physical properties, e.g., smoothness, as a result of the coating process, the presence of coating on the surface during handling, shipping, storage and the subsequent removal of the coating from the surface.

The present invention addresses and satisfies this long-standing need in the art.

SUMMARY OF THE INVENTION

In a first aspect, the present invention provides a method for protecting a substantially clean surface of glass from being contaminated by ambient contaminants and/or contaminants produced during the processing of the glass and/or scratching. The present inventive method comprises the steps of:

(A) forming a first protective coating on the surface of the glass by (i) applying an aqueous first coating composition comprising at least one polysaccharide to the surface, and optionally (ii) removing at least part of the solvent from the composition applied to the surface to leave a polysaccharide-containing protective coating on the surface having a thickness of at least 0.01 $\mu$m;

(B) forming a second protective coating over the first protective coating by (i) applying a second coating composition over the first protective coating, and optionally (ii) removing the solvent from the coating composition applied to the surface to leave a second protective coating; wherein, (a) the second protective coating is less soluble in water at or near ambient temperature than the first protective coating, and (b) the first and second protective coatings can be subsequently removed from the surface using an aqueous cleaning composition, to result in a surface which is substantially clean; and optionally (C) subsequently removing the first and second protective coatings from the surface of the glass using an aqueous cleaning composition, to result in a surface which is substantially clean.

In a second aspect of the present invention, it is provided an article of manufacture comprising:

(a) a glass sheet having at least one substantially flat surface;

(b) a first protective coating on the substantially flat surface comprising at least one polysaccharide, the coating having a thickness of at least 0.01 $\mu$m; and (c) a second protective coating over the first protective coating;

wherein (i) the protective coatings protect the surface from ambient contaminants, contaminants produced during the processing of the glass and/or scratching;

(ii) the second protective coating is less soluble in water than the first protective coating; and (iii) the protective coatings can be removed through application of an aqueous cleaning composition to result in a substantially clean surface.

The present inventive protection method can be used for any glass surface that is in need of temporary protection. The present inventive method can be advantageously employed in temporarily protecting a surface of an LCD glass sheet, which is substantially flat.

In the present invention, the at least one polysaccharide can comprise straight chain polysaccharide molecules and branched polysaccharide molecules. In certain preferred embodiments, the polysaccharide comprises starches, including straight chain starch molecules and branched starch molecules. In certain preferred embodiments, the first coating composition and the first coating, and/or the second coating composition and the second protective coating, comprise a plasticizer and/or a biocide. Preferably, the first protective coating has a thickness of less than 50 $\mu$m. More preferably, the thickness of the first protective coating is between 0.1 and 20 $\mu$m.

In certain preferred embodiments of the present invention, the second coating composition is an aqueous mixture comprising at least one polymer, such as a polymeric acid, and, preferably, the second protective coating is applied by spraying the aqueous mixture over the first protective coating.

In certain other preferred embodiments, the second coating composition and the second protective coating comprise a wax, such as petrolatum.

In still certain other preferred embodiments, the second coating composition and the second protective coating comprise polymer particles, and, preferably, the second protective coating is applied by spreading the polymer particles over the first protective coating before the first protective coating dries up.

In certain preferred embodiments of the present invention, the cleaning composition is a basic aqueous solution having pH of equal to or above 10. More preferably, the cleaning composition is an aqueous detergent solution, e.g., a commercially available detergent package, preferably used in connection with brush washing and/or ultrasonic cleaning. Preferably, the cleaning composition for removing the polymeric acid-containing protective coating is heated to a temperature in the range from 40° C. to 75° C.

In still certain other preferred embodiments of the present invention, the first and second protective coatings are formed as a part of the manufacturing process for the glass, such as a fusion draw or a slot draw process, and the like, wherein the manufacturing process produces newly formed glass at an elevated temperature of above 150° C. when it first comes into contact with the first coating composition. Although it is advantageous to integrate the present inventive method into the glass manufacturing process, it can be operated off-line after the glass is manufactured if so desired.

In other preferred embodiments of the present inventive method, the first and second protective compositions are applied by spraying onto hot glass surface. Other coating methods can be used to carry out the step (A) of the present inventive method, including, but not limited to, dip coating, flow coating, spin coating, by equipment such as meniscus coaters, wick coaters, rollers, and the like, where the coating compositions are in liquid form.

The present inventive method can comprise the additional steps between steps (B) and (C) of:

(a) cutting the glass; and (b) grinding and/or polishing at least one edge of the glass; wherein water or a water-containing composition is applied to the coated glass surface during at least one of steps of (a) and (b).

The present inventive method can also comprise the additional steps between steps (B) and (C) of:

(c) packing the glass with the protective coating closely with or without a spacing material; and optionally (d) subsequently storing, shipping and/or unpacking the glass.

The method and the coated glass of the present invention result in a number of advantages over prior art. For example, the protective coating system provides sufficient protection to the surface of glass against ambient contaminants, contaminants produced during the processing of the glass and/or scratching, thus potentially allows the glass sheets to be packed closely with minimal spacing material between them. In addition, the method of the present invention can be conveniently integrated into the overall glass manufacturing process, and the pristine surface of the glass can be revealed by removing the protective coatings sufficiently and conveniently without substantial change to its chemical composition and physical properties. In particular, the coating system of the present invention withstands water treatment during the cutting and grinding steps of the glass where water is used as a cooling agent.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

As used herein, "substantially clean" means sufficiently clean in terms of number of contaminants per unit surface area, water contact angle, surface roughness as measured by atomic force microscopy (AFM), or other parameters, such that the glass can be used for further applications as intended without the need of further cleaning of the surface.

As embodied and broadly described herein, the present invention provides a method for temporary protection of glass surface by providing a removable coating system on the surface of the glass.

Cleanliness of the surface of the glass substrate for a LCD display is of vital importance for the quality of the thin-film transistors formed on the surface of the substrate. The surface of the substrate is required to be substantially free of ambient contaminants and contaminants produced from the processing of the glass, including cutting and grinding. As discussed supra, adhesion of glass particles to the substrate surface is a long-standing problem in the manufacture of LCD glass. In particular, scoring at the bottom of draw (BOD) is a main source of adherent particles during substrate manufacturing. Ultrasonic cleaning and brush cleaning can remove some of the particles that deposited on the glass surface for a short period of time. However, such cleaning processes are not effective for particles deposited on the surface for more than a few days, especially if the storage environment is hot and humid, because permanent bonding between the particles and the glass surface may have taken place.

Therefore, it is desirable to have a protective coating system that can prevent particles from adhering to the LCD glass surface at the bottom of draw. Additionally, it is also desirable for the protective coating to provide resistance to scratching, which may frequently occur during the processing, handling, storage and shipping of the substrates. Excellent scratch resistance of the coating allows the glass sheets to be packed closely to each other with minimal use of spacing material between them. Besides protecting the substrate surface from ambient dirt and glass particle contamination and scratching, the coating should preferably be removable with reasonable cleaning technique using mild cleaning procedures, for example, a cleaning procedure that includes an ultrasonic detergent wash at 40° C. combined with some brush cleaning steps. Although in principle organic solvents can be used for cleaning and removing the protective coating, they are not preferred due to health, environmental and safety concerns. Rather, a mild cleaning procedure using aqueous cleaning composition is preferred.

Many commercial polymer products can be applied to the glass surface to form protective coatings, but they are not necessarily sufficiently removable from the glass surface under the above cleaning conditions due to their strong interaction with the glass surface. For example, there are many organic coatings having good water solubility at higher temperatures. However, the cleaning temperature of 40° C. is too low for many of them to be sufficiently removed from the glass surface. Moreover, although good aqueous solubility is desired, a coating should not be highly hygroscopic because it must be able to withstand a hot and humid environment without decreasing its coating effectiveness. In addition, in order not to change the surface chemistry and major physical characteristics, inter alia, smoothness, so that the glass surface revealed upon removal of the protective coating is fit for producing liquid crystal display without further surface treatment, the coating composition, the protective coating per se and the cleaning composition should not be chemically active or detrimental toward the glass surface.

In search for a suitable protective coating for LCD glass, the present inventors discovered the present inventive two-layer coating and the coating method, the details of which are given below. Generally, the two-layer protective coating of the present invention comprise a first protective coating, which is applied directly to the glass surface sought to be protected as a base coating, and a second protective coating, which is applied over the base coating. The first protective coating comprises at least one polysaccharide, and the second protective coating has a solubility in neutral water at room temperature lower than the first coating. The coating system of the present invention offers good protection to the glass surface, good removability under mild removing conditions, and good water resistance during processing steps where water is used as a cooling agent, such as the cutting and grinding steps.

A. The First Protective Coating and the First Coating Composition

As discussed above, the first protective coating and the first coating composition of the present invention comprise at least one polysaccharide. More particularly, the first protective coating of the present inventive two-layer coating system consists essentially of polysaccharide. As used herein, the term "consist essentially of" means that the first protective coating may contain ingredients other than polysaccharides, provided those ingredients do not materially alter the novel and basic features of the coating. Thus, "a coating consisting essentially of at least one polysaccharide" contains at least one polysaccharide and may comprise other ingredients, such as binders, biocides, plasticizers, and the like, as long as the other components do not materially alter the novel and basic feature of the first protective coating of the present invention. The first protective coating may be a homogeneous coating consisting essentially of a single polysaccharide, or a mixture of a variety of different types of polysaccharides, or a heterogeneous coating comprised of a plurality of layers of different polysaccharides.

It has been discovered that polysaccharide protective coating, used alone, can offer good protection to the glass surface. Co-pending patent application Ser. No. 09/941,182, entitled "WATER REMOVABLE COATINGS FOR LCD GLASSES," has a description of polysaccharide coating, which is incorporated herein by reference in its entirety. However, this application did not describe the use of polysaccharide coating as a base coating in conjunction with a second protective coating over it.

A wide variety of polysaccharides are known in nature. General discussions of polysaccharides and polysaccharide chemistry can be found in the following references, the relevant portions of which are incorporated herein by reference: T. M. Greenway, "Water-Soluble Cellulose Derivatives and Their Commercial Use," *Cellulosic Polymers, Blends, and Composites* (R. D. Gilbert Ed., Hanser Publishers, New York, 1994) 173–88; R. B. Evans & O. B. Wurzburg, "Production and Use of Starch Dextrins," *Starch: Chemistry and Technology, Volume* 2 (R. L. Whistler & E. F. Paschall Eds., Academic Press, New York, 1967) 254–78; S. Kitamura, "Starch Polymers, Natural and Synthetic," *Polymeric Materials Encyclopedia* (J. C. Salamone Ed., CRC Press, Boca Raton, Fla., 1996) 7915–22; and "Polysaccharides I: Structure and Function" and "Polysaccharides II: Chemical Modifications and Their Applications," *Essentials of Carbohydrate Chemistry* (J. F. Robyt Ed., Springer, New York 1998) 157–227 and 228–44.

Water solubility is low for most of the raw natural polysaccharides, but manufacturers degrade and modify natural products, e.g., by acid or enzymatic hydrolysis, to fit different industrial applications, such as, food, paper, pharmaceuticals, personal care, and paint. Depending on the modification, polysaccharides having a variety of water solubilities and viscosities are commercially available.

Starch derivatives, e.g., cornstarch derivatives, and cellulose ethers, e.g., the METHOCEL cellulose ethers sold by Dow Chemical, are the most common industrial polysaccharides. Low molecular weight products have excellent water solubility. They tend to form glossy, tough and flexible coatings. These materials have been used in foods and in the pharmaceutical industry, e.g., in the manufacture of pills, and coatings made from these materials have been proved to be non-toxic.

The METHOCEL family of polysaccharides includes two basic types of cellulose ethers: methylcellulose and hydroxylpropyl methylcellulose. Like starch, cellulose is composed of chains of D-glucose units but it has a different glycoside linkage configuration, i.e., its polymeric backbone is an all linear, β-1,4-glucosidic chain. This configuration results in various property differences between cellulose and starches. For example, naturally occurring cellulose is water insoluble with high molecular weights up to 2,000,000.

Depending on how the cellulose is modified, cellulose ether products can have a variety of different properties, such as, water solubility, surface activity and thickening.

The METHOCEL cellulose ethers are water soluble, but when a solution of this material is heated above a predetermined temperature, a gel forms. METHOCEL films can be made by evaporating water from a METHOCEL solution and the resulting films are clear, tough, flexible and non-toxic. In a low temperature aqueous solution, films can be rehydrated to form a gel and then go back into solution.

In addition to the starches and cellulose products discussed above, other polysaccharides that can be used in the practice of the invention include degraded polysaccharides, hydroxyethyl cellulose derivatives, exudate gums and their derivatives, and alginates. A single polysaccharide or a mixture of polysaccharides can be used in the practice of the invention, e.g., the coating can comprise one polysaccharide or a mixture of two, three, or more polysaccharides. Alternatively, a plurality of coating layers each comprising a different polysaccharide may be sequentially applied to the glass surface to form the first protective coating.

The mixtures and/or plural coating layers can be within one class of polysaccharides (e.g., a mixture of starches) or can be across classes (e.g., a mixture of a cellulose ether and a starch). The most preferred polysaccharides for use in the invention are starches. As used herein, the terms "starch" and "starches" includes both water soluble starches, water soluble starch derivatives and water soluble starch degradation products.

Starches are naturally occurring polymers. Potato, corn, tapioca, wheat and many other plants are commercial sources of starches. Some of the basic properties of starches are water solubility and biodegradability, i.e., degradation by microorganisms.

Chemically, starch is a polymer of D-glucose linked via α-1,4- or α-1,6-glucosidic binding. There are two kinds of starch polymer structures, namely, amylose structures and amylopectin structures. Amyloses are linear starch molecules formed via α-1,4-glucosidic binding. Amylopectins are branched starch molecules in which several short linear amylose chains with 20 to 25 D-glucose units each are linked via α-1,6-glucosidic bindings.

Native starches exist as cold water-insoluble granules. The granules are composed of amylose and amylopectin molecules associated by hydrogen bonding either directly or via water hydrates to form oriented micelles or crystalline areas. When water is added, starch granules absorb water and swell. With increasing temperature, the granules swell further and the viscosity of the solution increases. At the point of maximum viscosity, the starch granule structure is destroyed. Thereafter, the viscosity decreases gradually and a clear solution forms after the temperature passes the point of maximum viscosity.

Compared to native starches, starches preferred for use in the present invention have lower molecular weights and lower viscosities as a result of acid or enzyme degradation of the native material or of high molecular weight starch products derived from native starches. These lower molecular weights and lower viscosities result in coatings that dry much faster and are easier to wash from the glass surface with an aqueous detergent solution. These acid or enzyme degraded starches also have excellent solubility in cold water. These degraded starch products are sometimes called dextrins. They may include typical dextrin, maltodetrin and corn syrup solid.

Water-based spray coating is the preferred method for applying these coatings to glass substrates for particle and abrasion protection. For such applications, the aqueous solution preferably has a viscosity between 0.1 centipoise and 100 centipoise.

Examples of suitable starches are PURITY GUM 59, a waxy maize starch product which has been degraded by an enzyme and modified by propylene oxide, and CRYSTAL TEX 627, an acid-hydrolyzed tapioca starch dextrin. Both of these products are available from National Starch and Chemical Company, Bridgewater, N.J. Another example is Maltrin M200, a corn syrup solid made by Grain Processing Corporation, Muscatine, Iowa. They have low solution viscosities, i.e., 1 to 2 cps at 2.5% concentration, they form glossy and non-hygroscopic tough films, and they do not gel at the temperatures normally used for coating removal, e.g., temperatures of around 40° C.

Optional components can be added to the first coating composition, thus to the protective coating, to adjust the coating properties, solubility or dispersion of polysaccharide in the first coating composition, or to inhibit growth of biological materials in the protective coating and coating composition, and the like, in suitable amounts such that they will not materially alter the novel and basic features of the present inventive coating. Concentrated coating compositions can be prepared, stored, and diluted to the application concentration when desired.

As discussed above, starch coatings are biodegradable, which means that they are attacked by microorganisms such as bacteria and fungi. Under such circumstances, the first coating composition and the protective coating of the present invention preferably contain a biocide to inhibit growth and attack of biological materials during the storage and shipment of the first coating composition and coated glass. To this end, some commercial biocides, for example, KATHON LX (Rohm & Haas) and DOWICIL 75 (Dow Chemical Company) can be used. Sorbic acid and p-hydroxybenzoic acid esters are the additional examples. Inclusion of boric acid in the coating composition can also inhibit growth and attack of certain microorganisms. A biocide may change the chemical and mechanical properties of the coating. The amount of biocide in the coating composition, which thus becomes a part of the protective coating, should not exceed 20% by weight of the polysaccharide. Typically, concentration of a biocide in the first coating composition is in the range of 50 ppm and 1% by weight.

The polysaccharide first coating composition and the first protective coating of the present invention may also contain one or more plasticizers which may be a polyhydroxy compound. Examples of suitable plasticizers include, but are not limited to, sorbitol, glycerol, ethylene glycol, polyethylene glycol, and mixtures thereof. Such components can reduce the probability of the coating to become overly brittle at low humidity. Such plasticizers can also enhance the physical properties of the protective coating in terms of smoothness, mechanical strength which determines its scratch resistance, as well as the longevity of the coating. Typically, concentration of plasticizers in the first coating composition can range from 0 to 30% by weight of the polysaccharide.

The above description of biocides and plasticizers as optional components in first coating and the first coating composition are not exhaustive, but are illustrative only. Other components can be added and become a part of the first polymer protective coating on the glass surface if desired, as long as they do not alter the novel and basic features of the present inventive protective coating.

The first protective coating is preferably applied to the glass surface by spraying a solution of the polysaccharide and an aqueous solvent (e.g., deionized water) onto the surface and evaporating the aqueous solvent to form the coating. For example, the coating composition can be applied to a glass surface having a temperature in the range of 20–250° C. using an air spray gun with 20 to 60 psi pressure.

The coating is preferably applied to a newly formed sheet of glass immediately after the forming process. In particular, the aqueous solution is applied to the glass while its temperature is above 100° C., preferably above 150° C., and most preferably above 180° C., where the temperature of the glass is preferably measured with an infrared detector of the type commonly used in the glass making art.

Polysaccharides and, in particular, starches start to decompose above about 250° C. Thus, the preferred glass temperature at the point of coating application is less than 250° C., a temperature which newly-formed glass reaches quite quickly in, for example, a fusion draw glass manufacturing facility. However, since a polysaccharide/water solution is being applied and since water has a high evaporation heat, the evaporation of water at the glass surface will cool the glass quickly. Thus, the coating solution can be applied to, for example, 300° C. glass without significant decomposition.

The temperature of the aqueous first coating composition when applied is preferably in the range of 20° C. to 85° C., i.e., heated solutions can be used. One benefit of using a heated solution is to help dry the coating when the glass substrate temperature is less than 150° C. Also, a heated solution has a lower viscosity than at room temperature which can be beneficial in achieving atomization of the solution. The temperature of the aqueous solution, of course, should be below the gel point of the polysaccharide used for those polysaccharides that have a gel point.

Application of the coating as part of the glass manufacturing process is advantageous because the glass is clean, and the coating will protect the glass during the remainder of the manufacturing process. Application of a coating to glass at elevated temperatures means that the application time may need to be relatively short depending on the rate at which the glass is being formed and the desired minimum glass temperature at the end of the application process.

The glass may be formed by several different processes, including float processes, slot-draw processes, and fusion draw processes. See, for example, U.S. Pat. Nos. 3,338,696 and 3,682,609, which are incorporated herein by reference in their entirety. In the slot-draw and fusion draw processes, the newly-formed glass sheet is oriented in a vertical direction. In such cases, the aqueous solution should be applied under conditions that do not result in the formation of drips since such drips can interfere with cutting of the glass, e.g., the drips can cause the glass to crack. In general terms, dripping can be avoided by adjusting the spray level to keep the glass at a temperature above 100° C. throughout the coating process. As the spray level is adjusted, e.g., reduced, the concentration of polysaccharide in the solution also needs to be adjusted, e.g., increased, to insure that an adequate amount of polysaccharide reaches the surface to fully cover the surface of the glass.

Rather than spraying, the coating can also be applied from a flexible material impregnated with a solution of the coating material. Other possibilities include dipping, meniscus coating, rollers, brushes, spin-coating, or any other process which brings the coating solution into contact with the glass surface. Spraying is considered the most preferred since it readily accommodates movement of the glass introduced by the glass manufacturing process. Typically, both sides of the glass will be sprayed simultaneously, although sequential coating of individual sides can be performed if desired.

The coating thickness should be above 0.01 μm and is preferably less than 50 μm. Most preferably, the coating thickness is between 0.1 and 20 μm. When the coating is too thin, pin holes occur easily, i.e., a continuous layer of polysaccharide is not formed. When the coating is too thick, it takes too long to remove the coating from the glass surface and the overall usage of coating materials is high.

B. The Second Protective Coating and the Second Coating Composition

As discussed above, the two-layer coating of the present invention comprises a second protective coating over the polysaccharide base coating. The second protective coating is designed, inter alia, to improve water resistance of the coating system. Thus, the second protective coating, the second coating composition, and the application process thereof should desirably and advantageously have the following features:

(1) The second protective coating should have a lower solubility in water than the first protective coating.

(2) The second protective coating should be compatible with the first coating. The application process and existence of the second coating should not destroy the integrity of the first coating. The protective effect of the first coating should not be substantially compromised or diminished by the second coating and its application process. The second coating should advantageously possess sufficient adherence to the first coating in order to offer meaningful additional protection. The bonding between the first protective coating and the second protective coating of the present invention may be effected through chemical bonds and/or physical forces, such as covalent bonds, hydrogen bonds, ionic bonds, or van der Waals force, or other mechanism.

(3) The removability of the coating system of the present invention should advantageously be sufficient to realize an easy and convenient restoration of the pristine glass surface where necessary notwithstanding the second protective coating. The second coating should advantageously be removable by an aqueous cleaning composition. Preferably, the whole coating system should be advantageously removable using a single removing composition. More preferably, the removing composition is a mild commercial cleaning package.

(4) The chemical and physical properties of the second protective coating are such that the application, presence and removal thereof will not substantially change the chemical and physical properties of the glass surface, as for the first protective coating.

(5) Preferably, the second protective coating should be easy to apply and possible to integrate into the glass manufacturing process so that the glass surface can be protected since the earliest stage.

(6) Like the first coating, the second coating should be advantageously environmentally friendly and pose as few as possible safety and health concerns in its application and removal.

The second protective coating can be a continuous film covering the whole outer surface of the first coating, a continuous porous network covering part of the outer surface of the first coating, or a layer formed by discrete or partly adjoined patches, particles or beads. Where the second protective coating is a continuous layer covering fully the first protective coating, the first protective coating is shielded from water during cutting and grinding if the second coating is not removed in the process. Where the second protective coating partially covers the first protective layer by, for example, forming a porous network over the first protective coating, it shields part of the first protective coating from water and holds the polysaccharide coating that may become loose or detached from the glass surface in place. Either way, the higher hydrophobicity or water insolubility of the second protective coating helps to prevent the first coating from being diminished, improved water resistance of the coating system, and enhances the coating system's protection against glass chips and other contaminants.

The second protective coating can be in solid state, or in the form of a gel, a viscous fluid or a liquid. The second coating composition, depending on the particular coating material, can be in solid form, an aqueous solution, a suspension or an emulsion containing the materials that form the second protective coating. The methods of forming the second coating, some detailed infra, vary for different coating compositions.

I. Polymer as the Second Protective Coating

The second protective coating may comprise at least one polymer. More particularly, the second protective coating system of the present inventive two-layer coating consists essentially of at least one polymer. "A coating consisting essentially of at least one polymer" contains at least one polymer and may comprise other ingredients, such as binders, solvents, biocides, plasticizers, and the like, as long as the other components do not materially alter the novel and basic feature of the second protective coating of the present invention. The polymer used for the second protective coating can be thermoplastic or thermosetting.

(i) Polymeric Acid

One example of the polymers that the second protective coating may comprise is polymeric acid. Polymeric acid has been discovered to be useable as a protective coating for LCD glass. Co-pending, co-assigned patent application Ser. No. 10/109,463 has a description of using polymeric acid protective coating, which is incorporated herein by reference in its entirety. A polymeric acid is a polyelectrolyte having at least one group capable of producing a proton upon contacting water, such as a —COOH group (carboxylic acid), a hydroxyl group in phenol and its derivatives, an anhydride group, and the like, and/or a salt and/or partial salt thereof. Polyelectrolytes are polymers with ionizable groups on their chain, and therefore, tend to ionize in aqueous solutions. The degree of ionization of polyelectrolytes varies depending on the number and properties of the ionizable groups on the polymer chains, polymer chain structure and pH of the solution. The polymeric acid used in the present invention can be an acidic homopolymer, or copolymer, including random, alternate and block copolymer, or a combination thereof. The number of ions on the polymeric acid chain varies as a function of the pH of the aqueous solution. Without intending to be bound by any particular theory, applicants believe that at higher pH, the acidic groups tend to dissociate better to form more ions and thus more electrical charges on the chain, leading to a high solubility of the polymeric acid in the aqueous solution, and vice versa. Thus, the polymeric acid second protective coating of the present invention can provide resistance to neutral water used as cooling agent in the cutting and/or grinding steps because of its relatively low solubility at neutral pH, and accordingly offer robust protection to the glass surface from contaminants during such processing steps of the glass, inter alia, glass chips. In the meantime, a polymeric acid second protective coating can be readily removed in a typical cleaning composition, which normally has pH higher than 10, where the polymeric acid has a higher solubility. This variable and controllable solubility of the polymeric acid in aqueous media provides the coating a combination of robust protection during cutting and grinding when neutral water is used, and sufficient removability in a cleaning composition, which preferably has higher pH.

A wide variety of polymeric acids are known. General discussion of polymeric acid and chemistry of polymeric acid can be found in the following references, the relevant portion of which are incorporated herein by reference: E. A. Berkturov, L. A. Bimendina & S. E. Kudaibergenov, "Polyelectrolytes," *Polymeric Materials Encyclopedia, Volume* 8 (J. C. Salamone Editor-in-Chief, CRC Press, 1996) 5800; *Polyelectrolytes and Their Applications* (A. Rembaum & E. Selegny Eds., Reidel: Dordrecht, Germany, 1975); C. A. Finch, *Chemistry and Technology of Water-soluble Polymers* (Plenum: New York, N.Y. 1983); and F. J. Glavis, *Poly(acrylic acid) and Its Homologs in Water-Soluble Resins* (R. L. Davidson & M. Sittig Eds., Chapman & Hall, Ltd., London 1962) 133. Non-limiting examples of polymeric acid suitable for the second coating composition and the second protective coating of the present invention are homopolymers, copolymers, mixtures and other combinations of acrylic acid, methacrylic acid, maleic acid and their anhydrides, and polymers containing an acidic hydroxyl group as in the case of phenol and their derivatives. Many polymeric acids suitable for use in the present invention are commercially available, for example, polyacrylic acid and poly(methyl vinyl ether-alt-maleic acid) from Aldrich.

As defined supra, polymeric acid as used herein includes polymers having at least one group capable of producing a proton upon contacting water, and/or a salt or partial salt thereof. A partial salt is a polymeric acid with a part of the acidic groups on its chain neutralized by a base. For example, a partial ammonium salt of a polymeric acid is a polymeric acid partially neutralized by ammonia. As long as the polymeric acid-containing protective coating formed over the first protective coating demonstrates sufficiently low solubility in water and sufficiently high solubility in the cleaning composition under an acceptable condition, the polymeric acid used in the coating composition and the formed coating of the present invention can be neutralized by one or more bases in any suitable proportion. Thus, the polymeric acid in the coating composition and the formed coating may take various forms in various proportions. The salt and/or partial salt can be an ammonium salt, a sodium salt, a potassium salt, and the like, or a combination thereof. Preferably, the salt and/or partial salt, if contained in the polymeric acid, is ammonium salt or an alkaline metal salt. More preferably, the salt and/or partial salt is an ammonium salt. The proportion of salt to unneutralized polymeric acid can range from 0% to 100%.

(ii) Polyvinyl Alcohol

Another example of the at least one polymer that the second protective coating and the second coating composition of the present invention may comprise is polyvinyl alcohol. The polyvinyl alcohol suitable for the second protective coating has an average molecular weight of at least 50,000 g/mol, preferably at least 100,000 g/mol, more preferably 150,000 g/mol, and a degree of hydrolysis of at least 90%, preferably at least 95%, more preferably at least 97.5%. Generally, solubility of polyvinyl alcohol with a high average molecular weight and high degree of hydrolysis in neutral water at room temperature is very low (almost insoluble), while its solubility in hot water (80° C., for example) is quite high. Thus, the polyvinyl alcohol second protective coating provides good hydrophobicity and water resistance to the coating system of the present invention during the grinding and cutting processes where room temperature water is generally used as a cooling agent because of its lower solubility in neutral water at room temperature. The polyvinyl alcohol can be removed by using a heated aqueous cleaning composition.

(iii) Hydrophobically Modified or Insolubilized Polysaccharides

Hydrophobically modified or insolubilized polysaccharides are a category of polymers suitable for the second protective coating as well. By "hydrophobically modified or insolubilized," it is meant that the polysaccharide is modified by reaction with chemical modifiers or by admixture with more hydrophobic additives to make the coating more water resistant or essentially insoluble in neutral water at or near ambient temperature, or by both. A typical chemically reactive hydrophobic modifier of polysaccharide is glyoxal, which is a highly reactive dialdehyde. For example, cornstarch or potato starch can easily react with glyoxal to form hemiacetals followed by further reaction to form acetals, which are more water resistant than unmodified starches. Formaldehye, like glyoxal, is also an effective crosslinking agent for starch and other polysaccharides, but is less preferred than glyoxal because of environmental and health concerns. A typical hydrophobic starch derivative is a starch modified by octenyl succinic andydride. The reaction between the starch and octenyl succinic andydride produces starch octenyl succinic ester. The hydrophobic octenyl chains thus attached to the starch molecule improve the hydrophobicity to the starch molecule. Addition of water-insoluble resins (such as resins of copolymers of unsaturated carboxylic acids—such as maleic acid anhydride or acrylic acid—with styrene, ethylene, alkyl vinyl ethers, alkenyl fatty acid esters, or other monomers), water-repellent additives (such as alkenyl succinic anhydride, alkyl ketene dimer, and stearylated melamine), latex dispersion (such as polystyrene butadiene, polyvinyl acetate and polystyrene acrylate), to the polysaccharide coating, for example, a starch coating, can enhance its water repellence. Such chemically and/or physically hydrophobically modified or insolubilized polysaccharide coating can conveniently serve as the second protective coating. They tend to have good compatibility with the first polysaccharide coating because of the structural similarity therebetween.

(iv) Other Polymers

Other polymers, so long as they have the features listed above for the second protective coating, may be employed in the second protective coating. Such other polymers include, but are not limited to, polyolefins, polysulfones, polyesters, polyethers, polyamides, polysiloxanes, polysilicone ethers, polyurethanes, or copolymers and mixtures thereof. The polymers may be natural, modified natural or synthesized products. They may be thermoplastic or thermosetting.

The thickness of the second polymer protective coating is at least 0.01 $\mu$m, preferably at least 0.1 $\mu$m to offer sufficient protection, and generally less than 100 µm, preferably less than 50 µm, and most preferably less than 20 µm to offer sufficient removability.

The second polymer coating composition is preferably an aqueous solution, suspension or emulsion of the coating material due to concerns of health, environment, safety and economy. However, organic solvents may be used alone or in addition to water to dissolve the coating materials to form the coating composition. Nonlimiting examples of organic solvents include alcohols, ketones, tetrahydrofuran and ethers. Concentration of the polymer in the second coating composition is not crucial to the present invention. For coating compositions with a higher concentration, coating can be effected with fewer application cycles and less application time. For coating compositions with a lower concentration, the protective coating of sufficient thickness can be obtained by multiple application cycles. Spray coating of aqueous coating composition is a preferred method for applying the second protective coating. Viscosity of the coating composition may vary as a function of the concentration of the coating material in the second coating composition. For applications of spraying coating of aqueous solution, the viscosity of the coating composition is preferably between 0.1 and 100 centipoise.

The polymer second coating composition can be prepared by dissolving the coating material in deionized water and/or other solvents. Optional components can be added to the second coating composition, thus to the protective coating, to adjust the coating properties, solubility or dispersion of the coating material in the solution, or to inhibit growth of biological materials in the protective coating and coating composition, and the like, in suitable amounts such that they will not materially alter the novel and basic features of the present inventive coating. Concentrated coating compositions can be prepared, stored, and diluted to the application concentration when desired.

Where the second protective coating is a hydrophobically modified or insolubilized polysaccharide coating, it can be produced by application of a modifier solution over the surface of the first protective coating, or by application of a preformed coating composition containing chemically and/or physically modified polysaccharide. For example, one embodiment of the present invention involves application of 40% by weight glyoxal aqueous solution over the first protective coating, either when the first coating has partially dried up or after it dries up completely. In this embodiment, essentially part of the first coating was transformed into the second protective coating, which has higher water resistance property than the largely unmodified first protective coating. In another embodiment of the present invention, the second protective coating was prepared by application of a preformed modified aqueous polysaccharide coating composition. The aqueous modified polysaccharide coating composition can be the typical polysaccharide coating composition used for the first coating composition added with (i) glyoxal; (ii) octenyl succinic anhydride; (iii) water-insoluble resins (such as resins of copolymers of unsaturated carboxylic acids—such as maleic acid anhydride or acrylic acid—with styrene, ethylene, alkyl vinyl ethers, alkenyl fatty acid esters, or other monomers); (iv) water-repellent additives (such as alkenyl succinic anhydride, alkyl ketene dimer, and stearylated melamine), (v) latex dispersion (such as polystyrene butadiene, polyvinyl acetate and polystyrene acrylate), or (vi) any mixture of at least two of (i), (ii), (iii), (iv) and (v).

Some of the polymer second coating compositions of the present invention may be bio-degradable, which means they may be attacked by microorganisms such as bacteria and fungi. Under such circumstances, the second coating composition and the protective coating of the present invention preferably contain a biocide to inhibit growth and attack of biological materials during the storage and shipment of the coating composition and coated glass. To this end, some commercial biocides, for example, KATHON LX (Rohm & Haas) can be used. Sorbic acid and p-hydroxybenzoic acid esters are the additional examples. Inclusion of boric acid in the coating composition can also inhibit growth and attack of certain microorganisms. A biocide may change the chemical and mechanical properties of the coating. The amount of biocide in the coating composition, which thus becomes a part of the protective coating, should not exceed 20% by weight of the coating material. Typically, concentration of a biocide in the coating composition is in the range of 50 ppm and 0.1% by weight.

The polymer second coating composition and the second protective coating of the present invention may also contain one or more plasticizers which may be a polyhydroxy compound. Examples of suitable plasticizers include, but are not limited to, sorbitol, glycerol, ethylene glycol, polyethylene glycol, and mixtures thereof. Such components can reduce the probability of the coating to become overly brittle at low humidity. Such plasticizers can also enhance the physical properties of the protective coating in terms of smoothness and mechanical strength, which determines its scratch resistance, as well the longevity of the coating. Typically, concentration of plasticizers in the coating composition can range from 0 to 30% by weight of the coating material.

The above description of biocides and plasticizers as optional components in the second protective coating are not exhaustive, but are illustrative only. Other components can be added to the second coating composition and become a part of the protective coating if desired, as long as they do not alter the novel and basic features of the present inventive protective coating.

(II) Wax as the Second Protective Coating

Wax as a group of hydrophobic materials can be used for the second protective coating as well. Wax as used herein refers to a substance that is a high viscosity fluid or a plastic solid at ambient temperature and that, when subjected to a moderately elevated temperature, becomes a low viscosity fluid. A wax may contain various components, including naturally occurring esters of fatty acids and certain alcohols as well as natural and synthesized products having resembling properties of the natural waxes. Depending on the source, waxes can be categorized to naturally occurring waxes and synthesized waxes. Many waxes are already known in the art. A general description of waxes can be found in William P. Cottom, "Waxes," *Polymer Material Encyclopedia, volume* 17 (Eds. Herman F. Mark et al., John Wiley & Sons, 1989), 614–626, the relevant portions of which are incorporated herein by reference.

Naturally occurring waxes suitable for the second protective coating include insect and animal waxes, such as beewax, spermaceti, and the like; vegetable waxes, such as carnauba, candelilla, Japan wax, ouricury wax, rice-bran wax, jojoba, castor wax, bayberry wax, and the like; mineral waxes, such as montan wax, peat wax, ozokerite and ceresin waxes, petroleum waxes, and the like. Petroleum waxes are preferred because of their stability and consistency in quality and composition.

Petroleum waxes are derived from petroleum and are generally hydrocarbons of three types: paraffin, semicrystalline or intermediate, and microcrystalline. A paraffin wax consists principally of normal alkanes. Microcrystalline wax contains substantial proportions of branched and cyclic saturated hydrocarbons, in addition to normal alkanes. Semicrystalline wax contains more branched and cyclic compounds than paraffin waxes, but less than microcrystalline. Any wax in these three categories can be used for the second protective coating owing to their good hydrophobicity. A mixture of waxes of different categories, such as petrolatum, may be conveniently used as well. Petrolatum, often referred to as petroleum jelly, is an amorphous mixture of microcrystalline wax, mineral oil and paraffin wax. Many commercially available petroleum waxes can be used directly for the second protective coating, or used after being formulated into the second coating composition. Non-limiting examples of commercial petroleum waxes are M 0745 and R 7132 from Moore & Munger, Inc., Shelton, Conn.

Synthetic waxes suitable for the second protective coating include, but are not limited to, polyethylene waxes, Fischer-Tropsch waxes, chemically modified waxes, substituted amide waxes, and polymerized α-olefin waxes.

Waxes can be applied directly as the second coating composition over the first protective coating using a brush, a roller, and the like, if it is in vicious liquid form at ambient temperature, such as petrolatum. If the wax has a relatively higher melting temperature zone, it may be heated moderately to liquid state and then coated by a brush or roller or other conventional means, such as hot-melt spray. Where the glass is still hot after the first protective coating is dried, ground solid wax particles may be sprinkled, sprayed or otherwise dispensed onto the glass surface, which, heated to above its melting temperature by the residual heat of the glass, will liquefy and form a coating over the first protective coating.

The waxes can be formed into an aqueous suspension or an emulsion as the second coating composition. Surfactants may be added to the aqueous suspension or emulsion to stabilize the wax dispersion. The second coating composition, an aqueous wax dispersion, can then be conveniently applied to the surface of the first protective coating by brush coating, roller coating, and preferably, spray coating. Upon removing the solvent from the second coating composition by drying, a second wax protective coating is formed over the first protective coating.

(III) Solid Particles as the Second Protective Coating

The second protective coating maybe formed by solid particles. The particles attach to the surface of the first protective coating, or are partially embedded in the first protective coating layer. Adjacent particles may or may not be bonded with each other. The particles are made of materials that have a lower solubility in neutral water than the underlying first protective coating. The hydrophobicity of the particles shield part of the first protective coating layer from water during cutting and grinding, and thus improves the water resistance of the coating system of the present invention. Also, the presence of the particles on the surface of the glass increases the distance between the surface of glass sheets packed adjacent to one another, making it possible to pack the glass sheets without or with minimal spacing materials therebetween. The particles can be inorganic or organic, and are preferably organic or inorganic polymers, thermosetting or thermoplastic. The particles may be comprised of, inter alia, polyamides, polyesters, polyethers, polysulfones, polyaldehydes, polyketones, polyolefins, polydienes, polysilicone compounds, polyurethanes, or copolymers or mixtures thereof. Hardness of the particles is preferred not too high to cause scratches on the glass surface during the application and removal of the coating, as well as packing, grinding and transportation of the glass. The surface of the particles may be regular and smooth, for example, spherical or ellipsoidal (polymer beads), or irregular and rough, such as the surfaces of scraped plastic and rubber. Preferably, the surface of the particles are regular and smooth where they have a high hardness so that there are few sharp edges that would scratch the glass surface during the removal of the coating. However, particles with irregular shapes and surfaces may be used as well when hardness is low or when the particles are elastic or flexible, as in the cases of polyurethane foam particles, polydiene rubbers, polysilicone rubbers and the like. The particles may be beads derived from suspension polymerization, or may be obtained by scraping bulk polymer materials or by other means. Particle size and particle size distribution are not critical for the present invention. Generally, the particle size is within the range of 0.01–50 μm, preferably within the range of 0.1–20 μm. If the particle size is overly large, for example, over 50 μm, good adhesion between the particles and the first protective coating will be difficult to obtain. Finer particles adhere to the first protective coating better, and are easier to cover more areas of the surface of the first protective coating. Of course, a mixture of particles with both large and small particles is conducive to forming a dense particle coating as they can pack more closely to each other, and thus increase water resistance of the coating system. Non-limiting examples of polymer particles suitable for the second protective coating of the present invention include poly(methyl methacrylate) beads, poly(styrene-divinylbenzene) beads, polyvinyl chloride beads, polyvinyl dichloride beads, poly(styrene butadiene) and polyvinyl acetate beads.

The solid particles can be used as the second coating composition per se. Application of the polymer particles can be done by spreading, for example, sprinkling the particles onto the surface of the first protective coating before the first protective coating dries up. After the application of the particles, the coating system is subjected to further drying treatment. Once the first coating completely dries, the particles will adhere to the first coating or be partially embedded in the first coating, forming a second protective coating. Where the particles have a relatively low melting temperature, they may partially melt as a result of the residue heat of the first coating and the glass sheet. The melted particles harden as the temperature lowers to ambient temperature to form a bond with the first coating and possibly with the adjacent particles. Where the particles are made of relatively high melting temperature polymers or thermosetting polymers, they will not melt after application to the first protective coating, thus the second protective coating is formed by discrete particles.

Alternatively, the particles may be formed into an aqueous dispersion thereof, such as a suspension or an emulsion before application thereof to the first protective coating. Surfactants may be added to the dispersion to stabilize it. Where a dispersion is used as the second coating composition, it can be coated onto the surface of the first protective coating using conventional means, such as brush coating, roller coating, dip coating, flow coating, and spray coating, with spraying coating being preferred for its ease of application. Upon removal of solvent from the second coating composition, a second protective coating comprising the particles is formed over the first protective coating.

The application of the second protective coating is advantageously integrated into the overall glass manufacturing process as well. The second protective coating can be applied immediately after the application of the first protective coating. Of course, the second protective coating may be applied onto the first protective coating long after the first protective coating is formed where necessary. Preferably, the second protective coating is applied before any cutting or grinding steps where water is used as a cooling agent in order to take advantage of the water resistance of the second protective coating. However, the second coating composition may be applied multiple times, for example, one before cutting and grinding, one after cutting and grinding, where necessary, in order to impart sufficient protection to the glass surface during further processing and handling steps.

C. The Cleaning Composition and Removal of the Coatings

It is desired for a successful protective coating system to withstand the manufacturing process and still be sufficiently removable when necessary. The two-layer coating system of the present invention can be applied to the surface of glass before it is scored for the first time and is strong enough to survive the rest of the manufacturing process. The protective coating system of the present invention can be readily removed by a cleaning composition, usually in combination with application of additional cleaning technique, such as mechanical brushing, ultrasonic wave energy, and the like. Other alternative techniques for the removal of the coating, such as oxidation, e.g., ozone-based oxidation, $CO_2$ cleaning, $CO_2$ snow cleaning, $O_2$ plasma and pyrolysis cleaning can be employed either alone or in combination with other removing techniques, although the use of an aqueous cleaning composition coupled with ultrasonication and/or brush cleaning is preferred.

The cleaning composition for use in the present invention should advantageously be of a mild nature, which provides sufficient removability of the protective coating without substantially altering the chemical composition and physical properties, inter alia, smoothness, of the glass surface. The application of brushing and energy should meet this requirement as well. Though cleaning compositions based on or comprising organic solvents such as alcohols, tetrahydrofuran, ketones and ethers can be used for removing the protective coating in the present invention, an aqueous cleaning composition is preferred for environmental, health and safety concerns. Aqueous cleaning composition employed generally has alkaline pH, usually at least 10, preferably at least 11, more preferably around 12.5. However, very strongly basic solution should be avoided because they may react with the glass surface and change the chemical composition and/or physical parameters thereof. Any reactive component that will change the chemical and physical nature of the glass surface should be avoided. Typically, a mild detergent with various compositions is a part of the cleaning solution, which facilitates removal of the protective coating and other oily materials and particles. Where a detergent is present, its concentration in the cleaning composition is in the range of 2-8% by weight, and the cleaning composition will have alkaline pH. Removal of the protective coating can be conducted at a temperature in the range of 20-75° C., with higher temperatures normally resulting in more efficient removal of the coating, particles and organic contaminants. Cleaning time is normally between 1 and 20 minutes.

It should be noted that the removal of the coating can be done by the manufacturer of the glass or by the end user of the glass, such as a manufacturer of liquid crystal devices, after the glass is shipped with the protective coating thereon to the end user. Upon removal of the protective coating system, a pristine glass surface is revealed and can be used for further application, for example, the production of LCDs.

Figure 1:
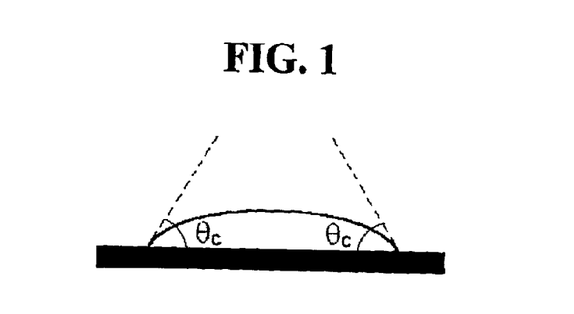
FIG. 1 is a schematic diagram showing the measurement of water contact angle on the surface of the glass in the present invention.

To verify removal of a coating, the wettability of the glass surface before and after the removal of the glass can be measured and compared. Water contact angle is a good indicator of wettability, which can be obtained using a variety of known methods in the art. A schematic diagram of the contact angle measurement is shown in FIG. 1, wherein $\theta_c$ is the contact angle, also referred to as the sessile drop contact angle in the art. Advantageously, the water contact angle of the glass surface upon removal of the protective coating has a value of less than or equal to 8°, indicating the glass surface is substantially clean. Other methods that can be used to determine coating removal include XPS (X-ray photoelectron spectroscopy) and TOF-SIMS (Time of Flight Secondary Ion Mass Spectrometry), which can be used in combination with water contact angle measurement. The surface upon removal of the coatings should advantageously have a Rms surface roughness as measured by atomic force microscopy of less than or equal to 0.40 nm.

D. Representative Benefits of the Present Invention

The present inventive coating system possesses all the technical advantages of a single polysaccharide coating by using a polysaccharide coating as the base coating, coupled with improved water resistance during stages where water is used as the cooling agent, such as in cutting and grinding of the glass. Thus, better protection to the glass surface is achieved.

One of the benefits of this invention is its ability to protect glass sheets from ambient contaminants which the glass may be exposed to during, for example, storage or transportation.

Another benefit is the ability of the invention to reduce chip adhesions when a glass sheet is cut or ground. As discussed above, glass chip adhesions present a significant problem in the manufacture of cut or ground glass, particularly in the manufacture of LCD glass.

In particular, the present invention reduces the formation of chip adhesions by providing a stable removable coating on the surface of the glass sheet. As used herein, the phrase "stable removable coating" means a coating that is bonded to the glass and that is not removed or significantly degraded during handling, storage and shipping, but is removable during the cleaning stage. The coating adheres to the glass via interactions with the silica on the glass surface, and acts as a barrier between the surface of the glass and the glass chips. Because the coating reduces or prevents glass chips from coming into contact with the surface of the glass sheet, the occurrence of chip adhesion is reduced.

A further advantage of the invention is that the surface of the glass sheet after removal of the coating has substantially the same chemistry and smoothness as it had prior to application of the coating. For example, the glass surface preferably has a RMS surface roughness less than or equal to 0.40 nanometers as measured by atomic force microscopy (AFM) after removal of the coating.

Moreover, the present invention makes it possible for the glass sheets to be packed closely to each other without or with minimal spacing material therebetween, because of the robust protection provided by the protective coating system of the present invention. And the extra second coating layer compared to a mono-layer coating increases the scratch resistance of the coating system.

The following examples provide further illustration of the present invention, and are not intended to limit the scope of the present invention to the specific embodiments described therein.

E. Examples

In the following examples, glass sheets used for the testing were 1737 LCD glass samples (5"×5"×0.7 mm) produced by Coming Incorporated, Coming, N.Y. Each sheet was covered on one side with a polymer film attached with an adhesive, and the other major surface had a film attached by static charge. Both coatings were removed from glass sheets followed by pre-cleaning. All glass sheets were pre-cleaned before application of the coating compositions. Pre-cleaning of the glass sheets in the examples were carried out in accordance with the following procedure: (1) 2% SEMICLEAN KG was sprayed on the substrates or coatings and hand-scrubbing performed using a clean-room cloth; (2) the substrates or coatings were subjected to ultrasound cleaning (40 kHz, 2% SEMICLEAN KG, about 40° C.) for 15 minutes; and (3) the substrates or coatings were subjected to brush cleaning with 2% SEMICLEAN KG and deionized water, and spin-drying using a brush cleaner (ULTRATECH 605 Photomask/Substrate Cleaner).

Water contact angles were measured to evaluate cleanness of the glass surface and removability of coatings in the examples. It has the advantages of being quick and easy. The coatings of the present invention have lower surface energies than glass surface, thus higher water contact angle are observed when coating residues are present on the glass surface. For a substantially clean glass surface free of polymer residues and contaminants, the water contact angle should be extremely low due to the high surface energy of the clean glass surface.

In the following examples, the first coating compositions used were all Crystal Tex 627, which is a starch-containing aqueous product available from National Starch & Chemical Company, with 0.1% boric anhydride added. Thus the first protective coatings consisted essentially of starch. The first coating composition was sprayed onto a surface of a glass sheet pre-cleaned and pre-heated to about 200° C.

To obtain coating thickness data, part of the coating measured in the examples was removed using a piece of sharp razor blade to reveal the glass surface. The coating was then measured against the exposed glass surface using a Zygo white light interferometric microscope (New View 5000 from Zygo Corporation, Middlefield, Conn.). Multiple spots of the coating were measured and the results were averaged to calculate the final coating thickness.

In the examples, all coatings were subjected to the following coating removal procedure: (1) hand-scrub the glass sheet with 2% Semiclean KG at room temperature; (2) clean the glass sheet in a countertop ultrasonic cleaner (Fisher Scientific Model 140) with 2% Semiclean KG at 40–45° C. for 15 minutes at 40 kHz; (3) thoroughly rinse the glass sheet with deionized water and then load the glass sheet in a water bucket; (4) brush-wash the glass sheet using Ultratech 605 Photomask Cleaner according to the following sequential program: 3 brush washer cycles with 2% Semiclean KG at room temperature; 4 deionized water brush cycles; 5 deionized water jet spray cycles; and 10 air jet spray cycles.

Example 1

Two coating systems were tested in this example, both using polymers that are more hydrophobic than starch as the second protective coating over a starch first protective coating.

In this example, the first coating composition had a concentration of starch of 10%. The two second coating compositions used in this example were (i) a styrene/acrylic co-polymer based emulsion (20% solids) available from Johnson Wax Professional, Sturtevant, Wis., and (ii) Chempeel WB high solids (55–60%) strippable coating product available from PPG Industries, One PPG Place, Pittsburgh, Pa., respectively.

The first protective coating was formed as discussed above. After the first coating dried up, the second coating composition was applied to the surface of the first protective coating layer and dried with an IR heater to form a second protective coating layer. Water contact angle was then measured on the surface of the second protective coating layer thus obtained and recorded as the first water contact angle $\theta_1$ in TABLE I. Subsequently, the coatings were subjected to removal procedures as described above. Water contact angle was then measured again on the cleaned glass surface and recorded as the second water contact angle $\theta_2$ in TABLE I.

As shown in TABLE I, water contact angle on the second protective coatings obtained from coating compositions (i) and (ii) were over 50° and 40°, respectively, both higher than the water contact angle on a starch coating, which is normally around 30°. Thus these two coatings were more repellent to water than a single starch coating. The second water contact angle data $\theta_2$ for the two second protective coatings obtained from coating compositions (i) and (ii) were both lower than 8° C., demonstrating that the glass surfaces were substantially clean upon removal of the coating systems and that the coatings were substantially completely removed under the mild cleaning condition.

Example 2

One coating system was tested in this example, using petrolatum as the second protective coating over a starch first protective coating.

In this example, the first coating composition has a concentration of starch of 5%. The second coating composition used in this example was petrolatum gel available from Fisher Scientific, Pittsburgh, Pa.

The first protective coating was formed as discussed above. The thickness of the dried first protective coating was about 1 μm. After the first coating dried up, the second coating composition (petrolatum gel) was applied to the surface of the first protective coating layer by smearing to form a second protective coating layer. Water contact angle was then measured on the surface of the second protective coating layer thus obtained and recorded as the first water contact angle $\theta_1$ in TABLE I.

Half of the glass sheet was then subjected to water treatment by dipping and immersion in deionized water for 1 minute. Coating thickness of the immersed side and the non-immersed side were measured using a Zygo white light interferometric microscope as discussed above and recorded in TABLE II, with the thickness of coating not subjected to water treatment reported as $T_1$, and the thickness of coating subjected to water treatment as $T_2$.

Subsequently, the coatings were subjected to removal procedures as described above. Water contact angle was then measured again on the cleaned glass surface and recorded as the second water contact angle $\theta_2$ in TABLE I.

As shown in TABLE I, water contact angle on the second protective coating obtained from petrolatum gel was over 100°, much higher than the water contact angle on a starch coating, which is normally around 30°. Thus the starch-petrolatum coating system was far more repellent to water than a single starch coating. The second water contact angle data $\theta_2$ for the starch-petrolatum coating was lower than 8° C., demonstrating that the glass surface was substantially clean upon removal of the coating system and that the two-layer coating was substantially completely removed under the mild cleaning condition.

The coating thickness data in TABLE 2 show that for the starch-petrolatum coating system, $T_2$ as measured was even greater than $T_1$ as measured. This might be caused by the unevenness of the coating. Nonetheless, the proximity between $T_1$ and $T_2$ is indicative that the coating thickness reduction, if any, was negligible during the water treatment of the coating system, showing the starch-petrolatum coating of the present invention had very good water resistance.

Example 3

Two coating systems were tested in this example, both using polymer beads as the second protective coating over a starch first protective coating.

In this example, the first coating composition has a concentration of starch of 10%. The second coating composition used in this example was (iii) poly(styrene-divinylbenzene) (PSDB, 20% divinyl benzene, average molecular weight 250,000 g/mol) beads and (iv) poly (methyl methacrylate) (PMMA, average molecular weight 25,000 g/mol) beads, respectively, both available from Polysciences, Inc., Warrington, Pa.

The first protective coating was formed as discussed above. Once the first coating composition was applied to the hot glass surface and before it dried up, the glass sheet was placed horizontally and the second coating composition (iii) or (iv) was applied to the surface of the first protective coating layer by sprinkling. After the coating dried up, excessive loose polymer beads were removed by flipping the glass sheet. Water contact angle was then measured on the surface of the second protective coating layer thus obtained and recorded as the first water contact angle $\theta_1$ in TABLE I.

Half of the glass sheet was then subjected to water treatment by dipping and immersion in deionized water for 1 minute. Coating thickness of the immersed side and the non-immersed side were measured using a Zygo white light interferometric microscope as discussed above and recorded in TABLE II, with the thickness of coating not subjected to water treatment reported as $T_1$, and the thickness of coating subjected to water treatment as $T_2$.

Figure 2:
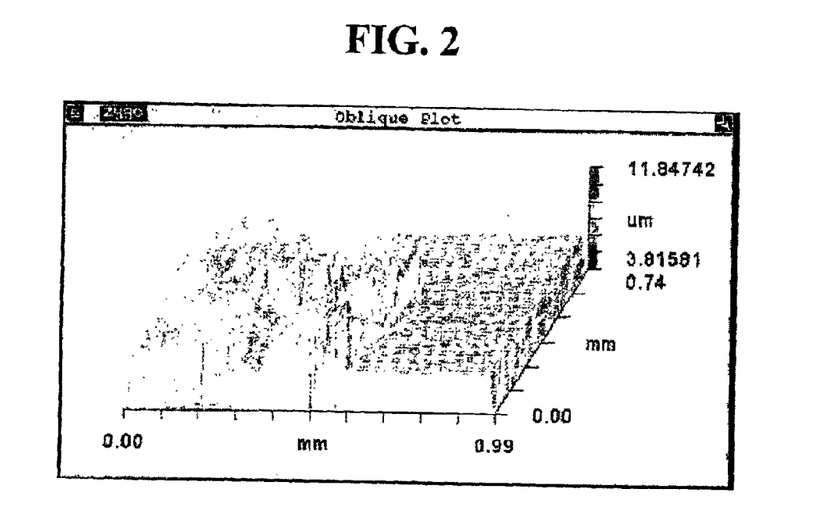
FIG. 2 is a diagram showing the morphology of a glass surface coated with a starch base coating and a poly(methyl methacrylate) bead top coating under a white-light interferometric microscope before the glass is treated by immersion in water.

FIG. 2 is a diagram showing the morphology of the glass surface coated with a starch base coating and a PMMA top coating under the interferometric microscope before the glass was treated by immersion in water; The rugged left side of the diagram shows the surface with the coating system, and the flat right side shows the surface of the glass after the coating was removed using a sharp razor blade.

Figure 3:
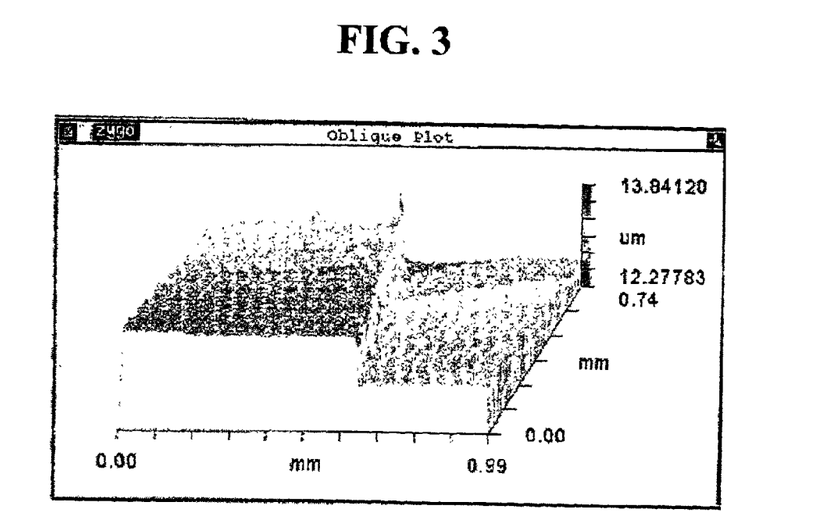
FIG. 3 is a diagram showing the morphology of the surface of the glass in FIG. 2 under a white-light interferometric microscope after it is treated by immersion in water.

FIG. 3 is a diagram showing the morphology of the surface of the glass in FIG. 2 under a while-light interferometric microscope after it is treated by immersion in water. Likewise, the rugged left side of the diagram shows the surface with the coating system after being treated by immersion in water, and the flat right side shows the surface of the glass after the coating was removed using a sharp razor blade.

Subsequently, the coatings were subjected to removal procedures as described above. Water contact angle was then measured again on the cleaned glass surface and recorded as the second water contact angle $\theta_2$ in TABLE I.

While FIGS. 2 and 3 as well as the $T_1$ and $T_2$ data in TABLE II indicate that the thickness of the starch/PSDB and starch/PMMA coating systems of the present invention might have diminished during the water treatment, the thickness reduction was acceptable for the purpose of protecting the glass surface, especially when the small $T_1$ data are taken into consideration. The residual submicron-thickness coating after water treatment would still provide sufficient protection against further contamination and scratching. Thus the very thin initial coating (as indicated by the $T_1$ data in TABLE II) provided sufficient protection during the water treatment. Where a thicker coating is desired after the water treatment, the original starch coating can be formed with a larger thickness, or additional starch coating can be applied after the water treatment.

As shown in TABLE I, water contact angles on the second protective coatings obtained from coating compositions (iii) and (iv) were similar to the water contact angle on a single starch coating, which is normally around 30°. This was caused by surface roughness as shown in FIG. 2 and FIG. 3 and incomplete coverage of the beads over the starch coating. It is known that water contact angle on a flat surface of a bulk polymer of either PSDB or PMMA should be much higher than 30°. For example, water contact angle on a flat PMMA surface is about 80°. Thus, the presence of polymer beads on the surface of the starch coating should nonetheless have improved the overall hydrophobicity of the coating system compared to a single starch coating. The second water contact angle data $\theta_2$ for the starch-petrolatum coating was lower than 8°, demonstrating that the glass surfaces were substantially clean upon removal of the coating system and that the two-layer coating was substantially completely removed under the mild cleaning condition.

TABLE I*

| Second Coating Composition | $\theta_1$ (°) | $\theta_2$ (°) |
| --- | --- | --- |
| i | 51 | ≦8 |
| ii | 42 | ≦8 |
| petrolatum | 108 | ≦8 |
| iii | 28 | ≦8 |
| iv | 31 | ≦8 |

*The sensitivity of the instrument for measuring water contact angle was 8°.

TABLE II

| Second Coating Composition | $T_1$ ($\mu$m) | $T_2$ ($\mu$m) |
| --- | --- | --- |
| petrolatum | 79 | 80 |
| iii | 0.1–5 | 0.15 |
| iv | 0.2–5 | 0.7 |

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

We claim:

1. A method for protecting a substantially clean surface of glass from contaminants and/or scratching, said method comprising the steps of:

(A) forming a first protective coating on the surface of the glass by (i) applying an aqueous first coating composition comprising at least one polysaccharide to the surface, and optionally (ii) removing at least part of the solvent from the composition applied to the surface to leave a polysaccharide-containing protective coating on the surface having a thickness of at least 0.01 $\mu$m;

(B) forming a second protective coating over the first protective coating by (i) applying a second coating composition over the first protective coating, and optionally (ii) removing the solvent from the coating composition applied to the surface to leave a second protective coating;

wherein, (a) the second protective coating is less soluble in water at or near ambient temperature than the first protective coating, and (b) the first and second protective coatings can be subsequently removed from the surface using an aqueous detergent cleaning composition, to result in a surface which is substantially clean; and optionally (C) subsequently removing the first and second protective coatings from the surface of the glass using an aqueous cleaning composition, to result in a surface which is substantially clean.

2. A method in accordance with claim 1, wherein the surface of glass is substantially flat.

3. A method in accordance with claim 2, wherein the glass is a glass sheet having at least one substantially flat surfaces and steps (A), (B) and optionally (C) are applied to the at least one substantially flat surface.

4. A method in accordance with claim 3, wherein the glass is used to make liquid crystal display after step (C).

5. A method in accordance with claim 1, wherein the glass surface after step (C) has a water contact angle of less than or equal to 8°.

6. A method in accordance with claim 5, wherein after step (C), the glass surface has a Rms surface roughness as measured by atomic force microscopy of less than or equal to 0.40 nm.

7. A method in accordance with claim 1, wherein the at least one polysaccharide comprises straight chain polysaccharide molecules and/or branched polysaccharide molecules.

8. A method in accordance with claim 1, wherein the at least one polysaccharide comprises at least one starch.

9. A method in accordance with claim 8, wherein the at least one starch comprises straight chain starch molecules and/or branched starch molecules.

10. A method in accordance with claim 8, wherein the starch is selected from dextrin, maltodextrin, corn syrup solid and mixtures thereof.

11. A method in accordance with claim 1, wherein the second coating composition is an aqueous mixture comprising at least one polymer.

12. A method in accordance with claim 11, wherein the second protective layer is applied by spraying the aqueous mixture comprising at least one polymer over the first protective coating.

13. A method in accordance with claim 1 or 11, wherein the first coating composition and/or the second coating composition comprise a plasticizer.

14. A method in accordance with claim 1 or 11, wherein the first coating composition and/or the second coating composition comprise a biocide.

15. A method in accordance with claim 11, wherein the at least one polymer in the second coating composition comprises at least one hydrophobically modified and/or insolubilized polysaccharide.

16. A method in accordance with claim 15, wherein the aqueous second coating composition is a polysaccharide coating composition modified by adding (i) glyoxal; (ii) octenyl succinic anhydride; (iii) at least one water-insoluble resin; (iv) at least one water-repellent additives; (v) at least one latex dispersion; or (vi) any mixture of at least two of (i), (ii), (iii), (vi) and (v).

17. A method in accordance with claim 15, wherein the hydrophobically modified and/or insolubilized polysaccharide is selected from glyoxal-crosslinked polysaccharide, octenyl succinic anhydride modified polysaccharide and mixtures thereof.

18. A method in accordance with claim 15, wherein the hydrophobically modified and/or insolubilized polysaccharide comprises hydrophobically modified and/or insolubilized starch.

19. A method in accordance with claim 18, wherein the aqueous second coating composition is a starch coating composition modified by adding (i) glyoxal; (ii) octenyl succinic anhydride; (iii) at least one water-insoluble resin; (iv) at least one water-repellent additives; (v) at least one latex dispersion; or (vi) any mixture of at least two of (i), (ii), (iii), (iv) and (v).

20. A method in accordance with claim 18, wherein the hydrophobically modified and/or insolubilized starch is selected from glyoxal-crosslinked starch, octenyl succinic anhydride modified starch and mixtures thereof.

21. A method in accordance with claim 16 or 19, wherein:
the at least one water-insoluble resin is selected from copolymers of unsaturated carboxylic acids with styrene, ethylene, alkyl vinyl ethers and alkenyl fatty acid esters;
the at least one water-repellent additive is selected from alkenyl succinic anhydride, alkyl ketene dimer, and stearylated melamine; and
the at least one latex dispersion is selected from polystyrene butadiene, polyvinyl acetate and polystyrene acrylate.

22. A method in accordance with claim 1, wherein the second coating composition reacts with the first protective coating to transform part of the first protective coating to the second protective coating.

23. A method in accordance with claim 22, wherein the second coating composition is an aqueous glyoxal solution.

24. A method in accordance with claim 11, wherein the at least one polymer in the second coating composition comprises polyvinyl alcohol.

25. A method in accordance with claim 11, wherein the at least one polymer in the second coating composition comprises at least one polymeric acid.

26. A method in accordance with claim 25, wherein the at least one polymeric acid is selected from the group consisting of (i) homopolymers and copolymers of carboxylic acid, phenols and acid anhydrides, salts and partial salts thereof, and (ii) mixtures and other combinations of the polymers.

27. A method in accordance with claim 25, wherein the at least one polymeric acid is selected from the group consisting of (i) homopolymers and copolymers of acrylic acid, methacrylic acid, maleic acid and their anhydrides, salts and partial salts thereof, and (ii) mixtures and other combinations of the polymers.

28. A method in accordance with claim 1, wherein the second coating composition comprises a wax.

29. A method in accordance with claim 28, wherein the second coating composition is a wax emulsion, and the solvent contained in the wax emulsion is removed after application of the second protective coating composition.

30. A method in accordance with claim 28, wherein the wax is applied over the first protective coating in melted state and cooled to solid state at room temperature.

31. A method in accordance with claim 28, wherein the wax is petrolatum.

32. A method in accordance with claim 1, wherein the second coating composition comprises polymer particles.

33. A method in accordance with claim 32, wherein the second protective coating is formed by spreading the polymer particles over the first protective coating before the first protective coating dries up.

34. A method in accordance with claim 32, wherein the polymer particles are selected from poly(styrene divinylbezene), poly(methyl methacrylate), polyvinyl choride, polyvinyl dichloride, poly(styrene butadiene), polyvinyl acetate, and mixtures thereof.

35. A method in accordance with claim 32, wherein the polymer particles are polymer beads having a particle size ranging from 0.1 µm to 1 mm.

36. A method in accordance with claim 1, wherein the cleaning composition is a basic aqueous solution having a pH of equal to or above 10.

37. A method in accordance with claim 36, wherein the cleaning composition has a pH equal to or above 11.

38. A method in accordance with claim 36, wherein the cleaning composition has a pH below 13.

39. A method in accordance with claim 1, wherein steps (A) and (B) are performed as part of the manufacturing process of the glass.

40. A method in accordance with claim 1, wherein step (A) is performed by applying the aqueous first coating composition to the surface of a glass at ambient temperature, and subsequently removing the solvent from the coating.

41. A method in accordance with claim 39, wherein the manufacturing process produces newly formed glass at an elevated temperature and step (A) is performed by applying the aqueous first coating composition to the newly formed glass at a point in the manufacturing process where the temperature of the newly formed glass just prior to contact with the first coating composition is above 150° C.

42. A method in accordance with claim 41, wherein the temperature of the newly formed glass just prior to contact with the first coating composition is below 300° C.

43. A method in accordance with claim 42, wherein the temperature of the newly formed glass just prior to contact with the aqueous solution is below 250° C.

44. A method in accordance with any one of claims 41 to 43, wherein the glass is manufactured by fusion draw or slot draw process.

45. A method in accordance with claim 44, wherein the glass is vertical in step (A) and the temperature of the glass remains sufficiently high throughout step (A) so that drips do not form on the surface.

46. A method in accordance with claim 44, wherein the temperature of the glass is at least 100° C. at the end of step (A).

47. A method in accordance with claim 1 or 39, wherein the first coating composition is applied to the glass surface by spraying.

48. A method in accordance with claim 1 or 39, wherein the first coating composition is applied to the glass surface by dipping the glass into the coating composition.

49. A method in accordance with claim 1 or 39, wherein the first coating composition is heated before application thereof to the glass surface.

50. A method in accordance with claim 1 or 39, further comprising the additional steps between steps (B) and (C) of:

(a) cutting the glass; and (b) grinding and/or polishing at least one edge of the glass;

wherein water or a water-containing composition is applied to the coated glass surface during at least one of steps of (a) and (b).

51. A method in accordance with claim 1, further comprising the additional steps between steps (B) and (C) of:

(c) packing the glass with the protective coating closely to another piece of glass with or without a spacing material; and optionally (d) subsequently storing, shipping and unpacking the glass.

52. A method in accordance with claim 1, wherein the first protective coating has a thickness of less than 50 µm.

53. A method in accordance with claim 1, wherein step (C) comprises one or more steps selected from: heating the aqueous cleaning composition to a temperature in the range from 40° C. to 75° C.; applying ultrasonic energy to the glass surface, the protective coating and the cleaning composition; and brush washing the glass surface with the protective coating.

54. A method in accordance with claim 1, wherein the protective coatings reduce the number per unit area of glass chips adhered to the glass surface by at least 90 percent compared to the number per unit area of glass chips adhered to an uncoated surface under comparable conditions.

55. A method in accordance with claim 54, wherein the number per unit area of glass chips adhered to the surface is reduced by at least 95 percent.

56. A method in accordance with claim 1, wherein the protective coatings reduce the number of scratches on the glass surface per unit area by at least 90% compared to the scratches per unit area on an uncoated glass surface under comparable conditions.

57. A method in accordance with claim 56, wherein the number of scratches is reduced by at least 95%.

* * * * *